(12) United States Patent
Wang et al.

(10) Patent No.: US 8,681,604 B2
(45) Date of Patent: Mar. 25, 2014

(54) ADDRESS REFRESH METHOD AND SYSTEM (75) Inventors: Bin Wang, Shenzhen (CN); Hong Shao, Shenzhen (CN); Shaoyong Wu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 160 days.

(21) Appl. No.: 13/375,626

(22) PCT Filed: Dec. 24, 2009

(86) PCT No.: PCT/CN2009/076004
§ 371 (c)(1),
(2), (4) Date: Dec. 1, 2011

(87) PCT Pub. No.: WO2010/139173
PCT Pub. Date: Dec. 9, 2010

(65) Prior Publication Data
US 2012/0087233 A1    Apr. 12, 2012

(30) Foreign Application Priority Data
Jun. 1, 2009  (CN) .......................... 2009 1 0147066

(51) Int. Cl.
*H04L 12/26*    (2006.01)
(52) U.S. Cl.
USPC ........... 370/217; 370/218; 370/219; 370/220; 370/221; 370/222
(58) Field of Classification Search
USPC ................................................ 370/217–228
See application file for complete search history.

(56) References Cited

U.S. PATENT DOCUMENTS

| 7,269,346 B1 | 9/2007 | Iyer et al. |
| 7,787,360 B2 * | 8/2010 | Windisch et al. ............. 370/217 |
| 7,944,815 B2 * | 5/2011 | Thomson et al. ............. 370/222 |
| 2009/0046576 A1 * | 2/2009 | Shand et al. .................. 370/217 |

FOREIGN PATENT DOCUMENTS

| CN | 1859220 A | 11/2006 |
| CN | 101039172 A | 9/2007 |
| CN | 101166110 A | 4/2008 |
| JP | 2008301003 | 11/2008 |
| WO | 2007119534 A1 | 10/2007 |

OTHER PUBLICATIONS

ITU (Ethernet ring protection switching, Jun. 22, 2008).*

(Continued)

*Primary Examiner* — Hassan Kizou
*Assistant Examiner* — Abdullahi Ahmed
(74) *Attorney, Agent, or Firm* — McClure, Qualey & Rodack, LLP (57) ABSTRACT

A method and a system for refreshing addresses are disclosed. Said method includes: when state switching between a link fault and a fault recovery occurs in a link, a node where a port related to this link is situated refreshing an address forwarding list, and configuring a flag PF for suspending an operation of refreshing an address forwarding list on other ports of this node, and sending protocol message with address refreshing information to other nodes; and when ports of other nodes receive said protocol message, refreshing the address forwarding list only when identifier information included in this protocol message is inconsistent with identifier information stored in this port and this port is not configured with said PF flag. Said method and system judge whether to refresh the address forwarding list according to said PF flag, and determine whether to refresh the address forwarding list according to the judgment result.

16 Claims, 6 Drawing Sheets

(56) References Cited

OTHER PUBLICATIONS

Masahiro Maruyoshi: "Standardization on Ethernet ring protection switching in ITU-T SG15"; NTT Access Network Service Systems Laboratories; Jan. 2009.

English Abstract translation of JP2008301003 (Published Nov. 12, 2008).
English translation of international search report of PCT/CN2009/076004.

\* cited by examiner

ADDRESS REFRESH METHOD AND SYSTEM

CROSS REFERENCE RELATED APPLICATIONS

This application is a national phase of PCT/CN2009/076004 filed Dec. 24, 2009, which claims priority to China Application Serial No. 200910147066.2, filed Jun. 1, 2009, both of which are entirely incorporated herein by reference.

TECHNICAL FIELD

The present invention relates to the data communication field, and in particularly, to a method and system for refreshing addresses.

BACKGROUND OF THE RELATED ART

In the practical application of the Ethernet, various protection techniques are widely used, and implement the redundancy backup between the active path and the standby path. When the active path and the standby path are both in the good condition, the protection data forwarding function of the standby path is blocked, and the protection data between networks are transmitted on the active path; when the fault occurs on the active path, the protection data forwarding function of the standby path is opened, and the protection data between networks are transmitted by switching to the standby path, so as to prevent the protection data from being repeatedly received and forming the broadcast storm, improving the anti-fault capability of the Ethernet, and satisfying the higher real-time requirement that the convergence time is less than 50 ms when switching.

Figure 1:
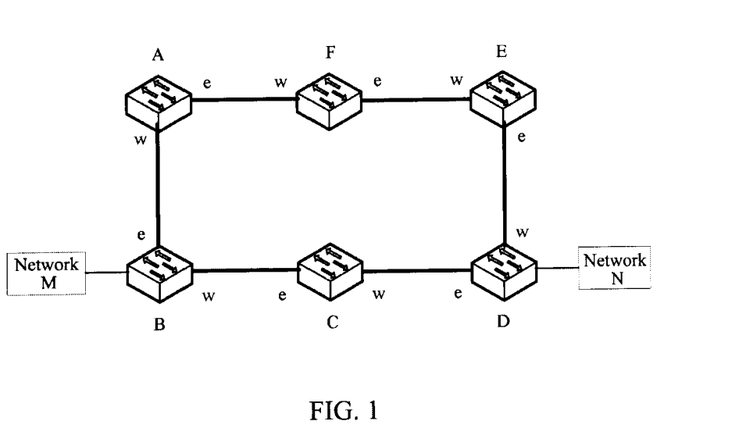
FIG. 1 is a topology diagram of the single ring in the Ethernet ring.

With reference to the Ethernet ring protection technique shown in FIG. 1, nodes A to F are all nodes with the Ethernet switching function, the network M connects with the node B, and the network N connects with the node D. The network M communicates with the network N. There are two physical paths between the network M and the network N, namely the network N <—> the node D <—> the node C <—> the node B <—> the network M, and the network N <—> the node D <—> the node E <—> the node F <—> the node A <—> the node B <—> the network M.

Figure 2A:
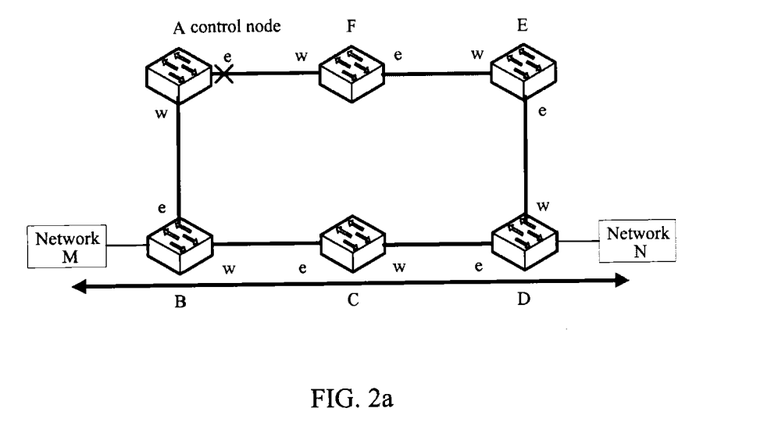
FIG. 2a is a topology diagram of the communication path when the link is in the good condition in the Ethernet single ring.

When the Ethernet ring protection technique is applied, the ring protection link and the control node are generally defined, namely in the fault-free case of the Ethernet ring, the link for blocking the data message to prevent the ring from forming on the ring is the ring protection link, and by operating this ring protection link, switching can be performed between the active path and the protection path of the ring network. The node with the ring protection link is called as the control node (or called as the main node) herein. As shown in FIG. 2a, the nodes included in the ring network are A, B, C, D, E, and F, the included links are links <A, B>, <B, C>, <C, D>, <D, E>, <E, F> and <F, A>. The node A is a control node, and the link <F, A> which directly connects with the e port of the node A is the ring protection link.

When the link on the ring is in a good condition, the control node blocks the data message forwarding function of the port connecting with the ring protection link, no ring is generated in the network, and the "broadcast storm" caused by the network ring is prevented. As shown in FIG. 2a, the control node A blocks the protection data forwarding function of the e port, and the communication path of the networks M and N is: the network M <—> the node B <—> the node C <—> the node D <—> the network N.

Figure 2B:
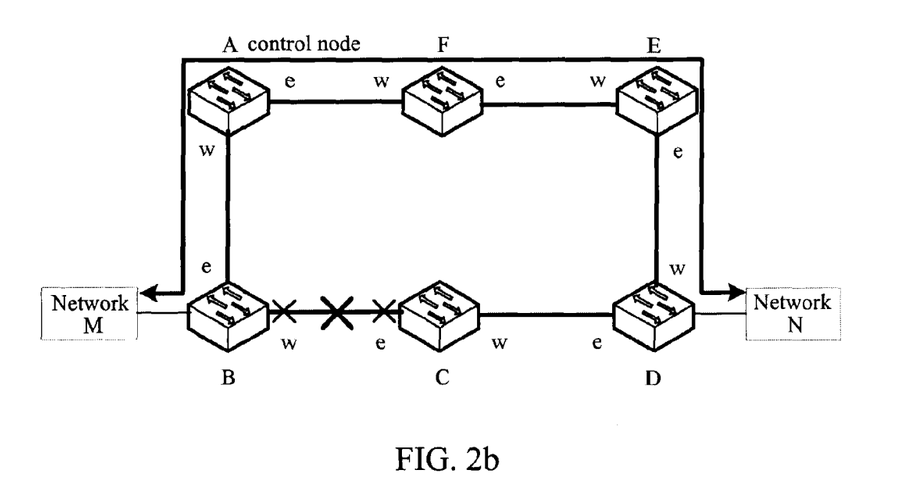
FIG. 2b is a topology diagram of the communication path when the fault occurs in the link in the Ethernet single ring.

When the fault occurs in the link, the control node opens the data message forwarding function of the port connecting with the ring protection link, thereby ensuring the connection of the service. As shown in FIG. 2b, a fault occurs in the link <B, C> on the ring, the control node A opens the data message forwarding function of the port e, and the new communication path of networks M and N is: the network M <—> the node B <—> the node A <—> the node F <—> the node E <—> the node D <—> the network N.

Actually, when the network topology changes, the nodes in the ring network should refresh the address forwarding list, which is for the purpose of preventing the data path from still transmitting along the path before the topology changing. For example, in FIG. 2a, the ring network does not have a fault, the communication path between the network M and the network N is the network M <—> the node B <—> the node C <—> the node D <—> the network N. When the fault occurs in the link <B, C> in the ring network, and if the communication path between the network M and network N still forwards along the previous path, data message will be discarded in large amount. At present, the ITU-T G.8032 uses the topology change point to periodically send the address refreshing message to solve the above problem, and the specific scheme of refreshing the address in the single ring is: when the port in the ring network of one node receives protocol message with the refreshing information, this port extracts the <Node_ID, BPR> information from this protocol message, wherein Node_ID is the information of the node which sends this protocol message, the BPR is used for pointing out which port on the ring of the node sending this protocol message is blocked, and the BPR parameter only has the local meaning. This port compares the <Node_ID, BPR> information in the message with the <Node_ID, BPR> information previously stored in this port. If these two are inconsistent, this port deletes the previously stored <Node_ID, BPR>, and stores the new <Node_ID, BPR>. If the newly stored <Node_ID, BPR> is inconsistent with the <Node_ID, BPR> stored in another port of this node on the ring are inconsistent, this node refreshes the address forwarding list, namely, deletes all the forwarding entries in the address forwarding list, and said forwarding entries are the basis for forwarding packets.

Figure 3:
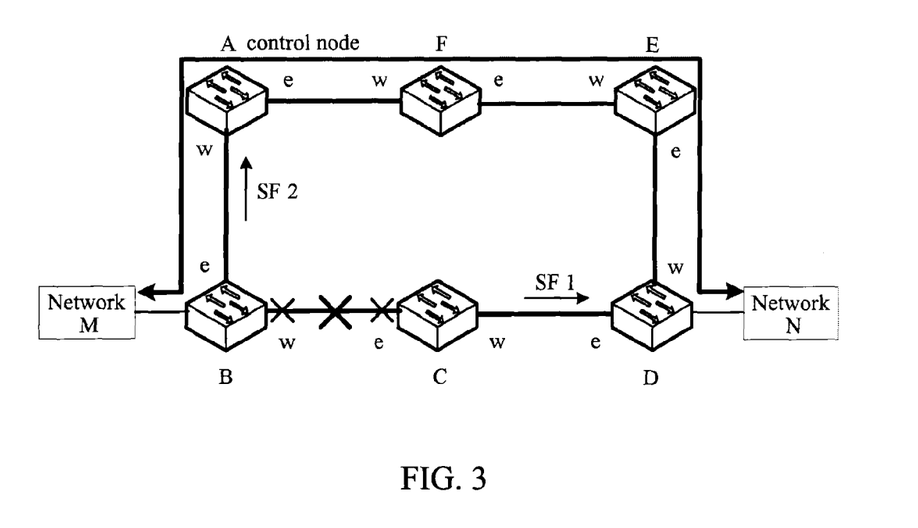
FIG. 3 is a topology diagram of the communication path after refreshing the address when the fault occurs in the link in the Ethernet single ring.

The above scheme solves quite well the repeated refreshing problem caused by periodically sending the message with the address refreshing information, namely, the problem of repeatedly refreshing the address forwarding list caused by the subsequent address refreshing message. However, this scheme is unable to completely eliminate the problem of repeatedly refreshing the address. As shown in FIG. 3, the fault occurs in the link <B, C>, the node C sends the SF1 message (the SF1 message includes the <Node_ID(C), e> information) along its w> port, and the node B sends the SF2 message (the SF2 message includes the <Node_ID(C), w> information) along its e port. The e ports of nodes D, E, F and A on the ring detect that the <Node_ID(C), e> in the SF1 is different from all of the <Node_ID, BPR> stored in their e port and w port when receiving the SF1 message for the first time, and refresh the address forwarding list. Similarly, the w ports of nodes D, E, F and A on the ring detect that the <Node_ID(B), w> in the SF2 is different from all of the <Node_ID, BPR> stored in their w port and e port when receiving the SF2 message for the first time, and refresh the address forwarding list. Nodes C, D, E, F, A and B on the ring refresh the address forwarding list twice.

It can be seen from the above example that each topology change on the ring will cause the node on the ring to refresh the address forwarding list twice in the traditional scheme, which will cause that the ring network is difficult to enter into the stable state from the broadcast storm state in short time. Therefore, a new scheme of refreshing the address needs to be promptly proposed.

SUMMARY OF THE INVENTION

In view of this, the main object of the present invention is to provide a method and a system for refreshing addresses, so as to reduce the phenomena of repeatedly refreshing the address forwarding list of the node caused by the topology changing and improve the network performance.

In order to achieve the above object, the technical scheme of the present invention is implemented in following way:

a method for refreshing addresses comprises:

when state switching between a link fault and a fault recovery occurs in a link, a node where a port related to this link is situated configuring a flag PF for indicating to suspend an operation of refreshing an address forwarding list on other ports of this node, and sending protocol message with address refreshing information to other nodes; and a node to which a port receiving said address refreshing information belongs refreshing the address forwarding list only when identifier information included in this protocol message is inconsistent with identifier information stored in the port receiving said protocol message and this port is not configured with said PF flag.

Said node to which said port receiving the protocol message belongs further performs following operations:

judging a consistency of the identifier information extracted from said protocol message with the identifier information previously stored in said port, and if inconsistent, this port storing new identifier information, and judging whether this port is configured with said PF flag, and if not configured with the PF flag, the node where this port is situated refreshing the address forwarding list, and configuring said PF flag on other ports, if configured with the PF flag, then said port only deleting said PF flag.

Said node to which said port receiving the protocol message belongs further performs following operations:

judging a consistency of the identifier information extracted from said protocol message with the identifier information previously stored in said port, and if consistent and this port has been configured with the PF flag, only deleting this PF flag.

The node where the port related to the link in which the state switching occurs further refreshes the address forwarding list.

Said protocol message at least includes identifier information of the node and identifier information of the port on the node related to a faulty link.

This method is performed in an Ethernet single ring network.

A system for refreshing addresses, a network applying this system includes at least two nodes, each node has at least two ports, said node comprises a control module, and each port on the node comprises a port judgment module and a port flag configuration module, wherein said port judgment module is for notifying said control module when state switching between a link fault and a fault recovery occurs in a link;

said control module is for refreshing an address forwarding list according to a notification of said port flag configuration module; and notifying the port flag configuration module of a port which is irrelative to a faulty link to configure a PF for indicating to suspend an operation of refreshing an address forwarding list; and is also for sending protocol message with address refreshing information to other nodes after receiving a notification of said port judgment module;

said port flag configuration module is for notifying said control module to refresh the address forwarding list when identifier information included in the received protocol message is inconsistent with identifier information stored in this port and this port is not configured with said PF flag; and is for configuring said PF flag according to a notification of said control module.

Said port flag configuration module is further for refreshing the address forwarding list after receiving the notification of said port judgment module.

Said port flag configuration module is further for: judging a consistency of the identifier information included in the received protocol message with the identifier information previously stored in the port to which said port flag configuration module belongs, and if inconsistent, storing new identifier information; also judging whether the port to which this port flag configuration module belongs is configured with said PF flag, and if not configured with the PF flag, notifying said control module to refresh the address forwarding list, and notifying port flag configuration modules of other nodes to configure the PF flag, if configured with the PF flag, only deleting said PF flag.

Said port flag configuration module is further for: only deleting this PF flag when judging the identifier information included in the received protocol message is consistent with the identifier information stored in the port to which said port flag configuration module belongs and the port to which this port flag configuration module belongs has been configured with the PF flag.

This system further comprises a data sending and receiving module, which is for supporting communication among all nodes in this system.

This system is configured in an Ethernet single ring network.

Said protocol message at least includes identifier information of the node and identifier information of the port on the node related to a faulty link.

It can be seen that since the method and system of the present invention can judge whether to refresh the address forwarding list based on the PF flag and further determine whether to refresh the address forwarding list according to the judgment result; and this operation does not change the network architecture and protocol dramatically, and therefore, the method and system of the present invention can be applied in the various communication networks which apply the address forwarding list, thereby efficiently reducing the phenomena of repeatedly refreshing the address forwarding list of the node caused by the topology changing and greatly improving the network performance.

PREFERRED EMBODIMENTS OF THE PRESENT INVENTION

The inventive concept of the present invention is that: when the state switching between the link fault and fault recovery occurs in the link, the node where the port related to this link is situated configures a flag for indicating to suspend the operation of refreshing the address forwarding list on other ports, which is denoted by PF in the following text, and sends the protocol message with the address refreshing information to other nodes on the ring, and the protocol message sent by said node at least includes identifier information of this node and identifier information of the port on this node related to the faulty link, said identifier information is denoted by <Node_ID, BPR> in the following text; the node to which the port receiving said protocol message belongs only refreshes the address forwarding list when the identifier information included in this protocol message is inconsistent with the identifier information stored in said port which receives this protocol message and this port is not configured with the PF flag.

The following application is illustrated by taking the Ethernet single ring network as an example.

The state switching between the link fault and fault recovery occurring in the link might mean that the fault occurs in the link or the link recovers to the normal state from the faulty state, and the "fault occurs in the link" refers to these following conditions: one port on the ring of a certain node is blocked or has a fault, thereby causing the link related to this port to be unable to work normally; or a certain link is blocked. In sum, it is believed that a fault occurs in a certain link as long as this link can not work normally.

Specifically, when ports on the ring of other nodes in the Ethernet single ring network receive the protocol message with the address refreshing information, following processing is performed:

extracting <Node_ID, BPR> information from the received protocol message, and performing the consistency comparison on the extracted <Node_ID, BPR> information with the <Node_ID, BPR> information which is previously stored in this port, and if inconsistent, this port deleting the previous <Node_ID, BPR>, storing the new <Node_ID, BPR>, and judging whether this port is configured with the PF flag, and if there is no PF flag, then the node where this port is situated refreshing the address forwarding list, and configuring the PF flag on another port on the ring; if there is the PF flag, then this port only deleting the PF flag, and the node where this port is situated not refreshing the address forwarding list. If the newly received <Node_ID, BPR> and the <Node_ID, BPR> previously stored by said port are consistent and said port has been configured with the PF flag, this port deletes the PF flag.

Figure 4:
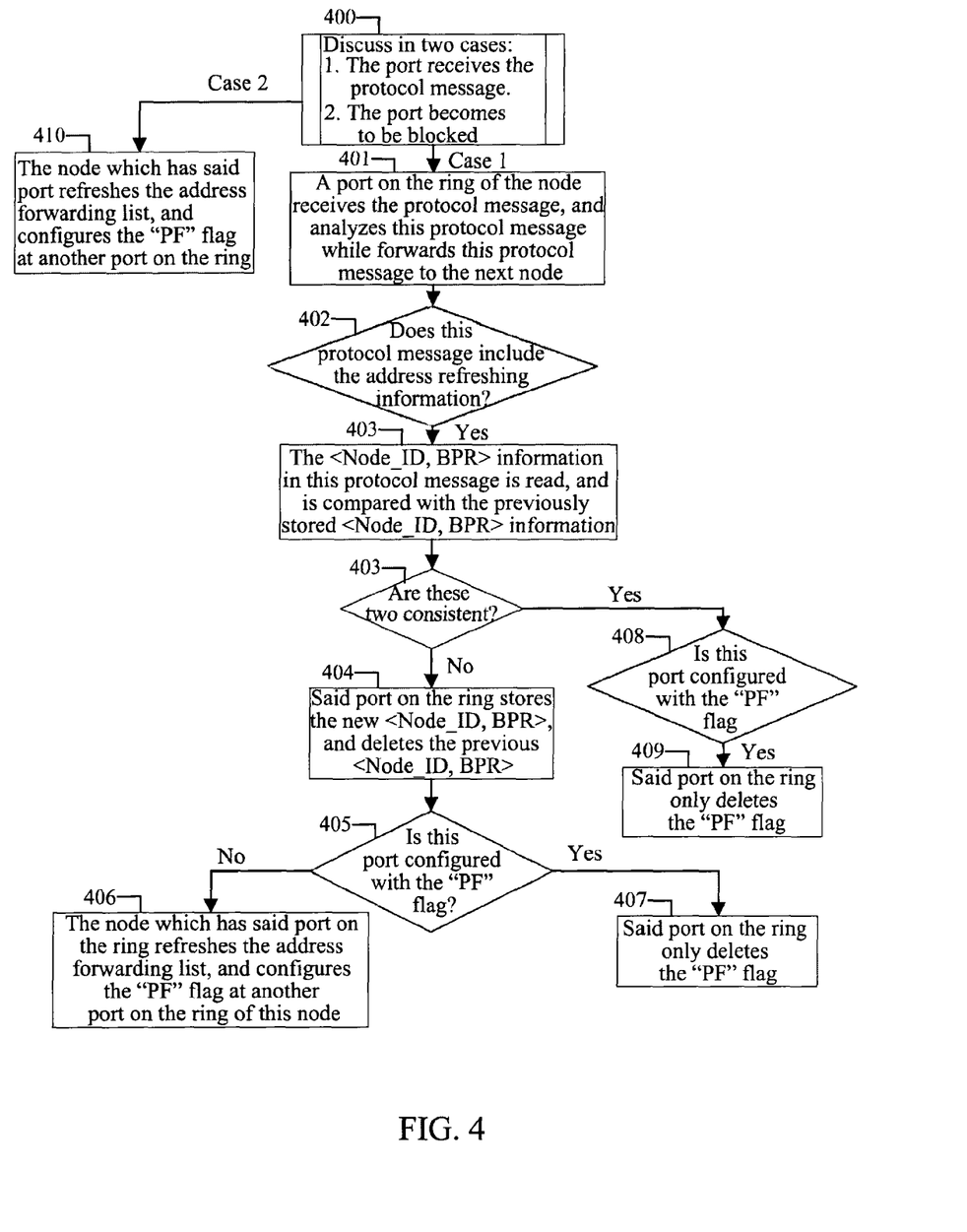
FIG. 4 is a working flow chart according to the example of the present invention.

The following is the basic steps of this technical scheme, as shown in FIG. 4:

step 400, it is discussed by dividing into two cases: 1) the port on the ring receives the protocol message, and step 401 is performed; 2) the port on the ring becomes to be blocked, and step 410 is performed;

step 401, a port on the ring of a certain node in the Ethernet single ring network receives the protocol message, and analyzes this protocol message while forwarding this protocol message to the next node;

step 402, said port on the ring analyzes whether this protocol message includes the address refreshing information, and if it includes the address refreshing information, step 403 is performed, or else, no processing;

step 403, the port on the ring analyzes whether the <Node_ID, BPR> information included in the protocol message is consistent with its previously stored <Node_ID, BPR>, and if inconsistent, step 404 is performed, or else, step 408 is performed;

generally, only when the "Node_ID" and "BPR" in the <Node_ID, BPR> are both consistent with the "Node_ID" and "BPR" in the previously stored <Node_ID, BPR>, these two are considered to be consistent.

Step 404, said port on the ring stores the new <Node_ID, BPR>, and deletes the previous <Node_ID, BPR>;

step 405, said port on the ring checks whether this port is configured with the PF flag, and if not configured, step 406 is performed, or else, step 407 is performed.

step 406, the node which has said port on the ring refreshes the address forwarding list, and configures the PF flag in another port on the ring of this node, ending;

step 407, said port on the ring only deletes the PF flag, ending;

step 408, it is judged whether said port is configured with the PF flag, and if configured with the PF flag, step 409 is performed, or else ending;

step 409, said port on the ring only deletes the PF flag, ending;

step 410, regarding to the case 2, the node which has said port refreshes the address forwarding list, and configures the PF flag in another port on the ring.

Application Example 1 below it will describe the present invention with reference to the figures in combination with specific examples, however, the present invention is not limited to following examples.

Figure 5A:
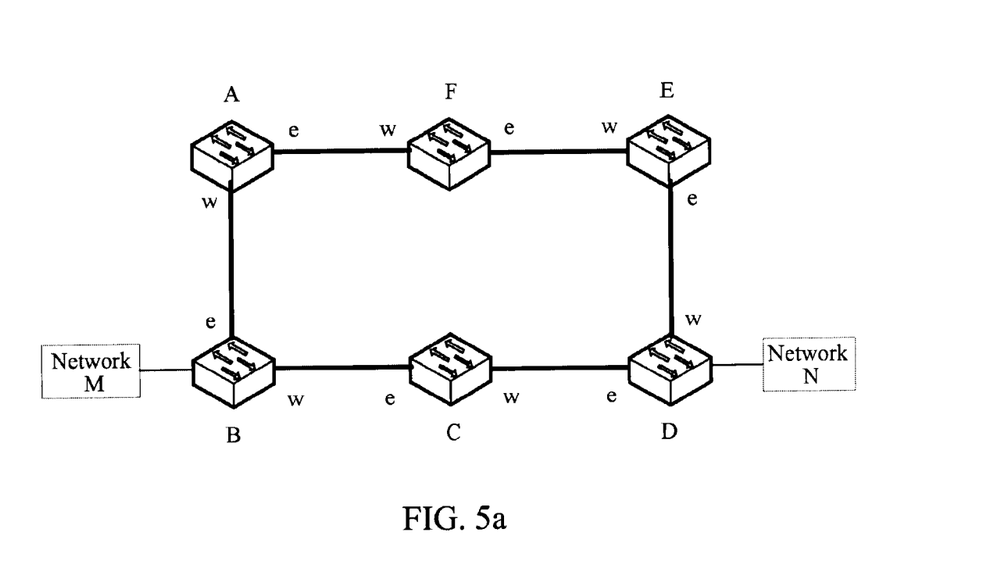
FIGS. 5a and 5b are the schematic diagrams of the example 1 of this scheme.
Figure 5B:
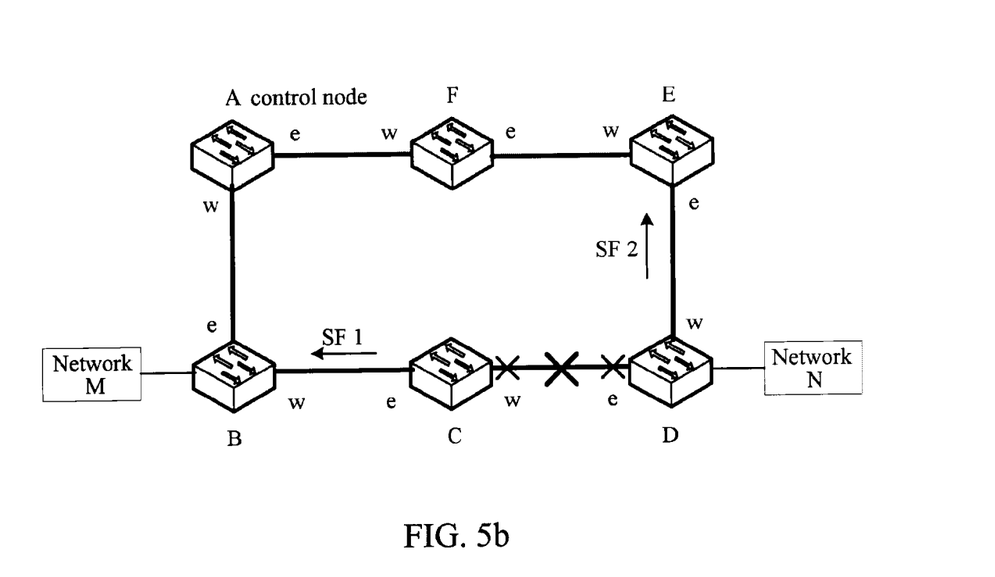

FIG. 5a and FIG. 5b are one specific example in a case of the fault occurring in the ring network according to the present invention:

as shown in FIG. 5a, the ring network includes nodes A, B, C, D, E and F, and includes links <A, B>, <B, C>, <C, D>, <D, E>, <E, F> and <F, A>. The node A is a control node, the link <F, A> which directly connects with the e port of the node A is the ring protection link, and e port of the node A blocks the forwarding of the data message in the normal condition.

As shown in FIG. 5b, a fault occurs in the link <C, D> of the ring network, the node C refreshes the address forwarding list, configures the PF flag in the e port at the same time, and periodically sends the SF1 message (including the address refreshing information and <Node_ID(C), w> information) along the e port. The node D refreshes the address forwarding list, configures the PF flag in the w port at the same time, and periodically sends the SF2 message (including the address refreshing information and <Node_ID(D), e> information) along the w port.

Without the generality, the node F on the ring is selected to perform the analysis, if its w port receives the SF1 message at first, the <Node_ID(C), w> information in the SF1 message is read, and if this information is inconsistent with the <Node_ID, BPR> previously stored by the w port, the w port of the F node stores the <Node_ID(C), w> information, and deletes the previous <Node_ID, BPR> information. The F node detects that its w port is not configured with the PF flag, thus the F node refreshes the address forwarding list, and configures the PF flag in the e port. The node F receives the SF2 from its e port after a while, reads the <Node_ID(D), e> information from the SF2 message, and if this information is inconsistent with the <Node_ID, BPR> previously stored by the e port, the e port of the F node deletes the previous <Node_ID, BPR> information, and stores the <Node_ID, BPR> information. The F node checks that its e port is configured with the PF flag, and thus only deletes the PF flag configured on the e port.

It can be seen from the above analysis that the SF2 message will not cause the 2nd address refreshing action of the node F.

Application Example 2

Figure 6A:
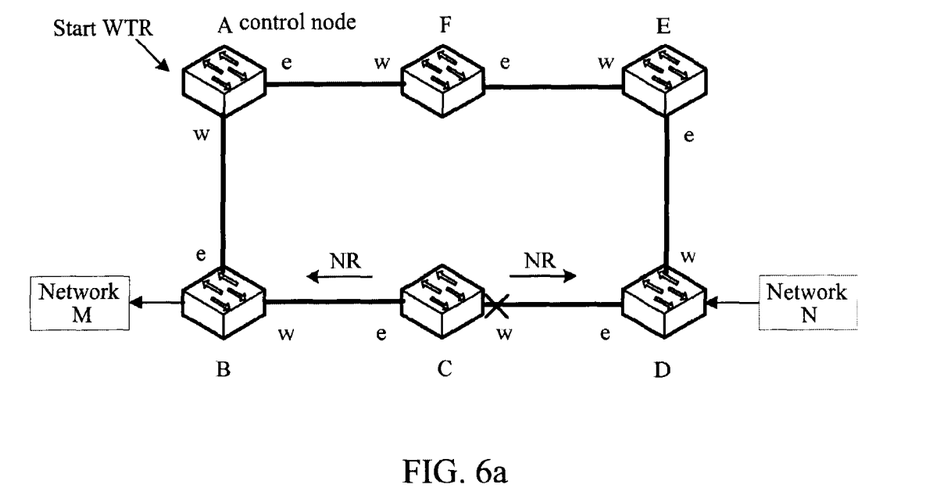
FIGS. 6a and 6b are the schematic diagrams of the example 2 of this scheme.
Figure 6B:
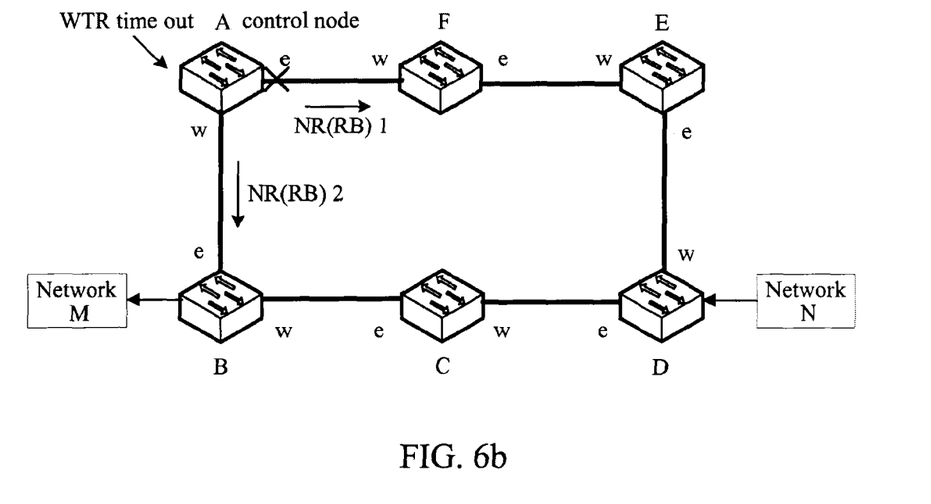

FIG. 6*a* and FIG. 6*b* are one specific example in a case of the fault in the ring network recovering according to the present invention:

as shown in FIG. 6*a*, when the fault of the link <C, D> of the ring network disappears, the node C periodically sends the NR (NODE C) message (no request message) out along its two ports in the good condition, and this message is used for notifying the node on the ring that "the fault in the adjacent link of the node sending this message or the node sending this message has disappeared", wherein the NODE C is the node number of the node C which sends this message. The node D periodically sends the NR (NODE D) message out along its two ports in good condition. The node D receives the NR (NODE C) message sent by the node C, and detects that the NODE C in this message is larger than its own node number, the node D opens the data message forwarding function of its own e port, and stops sending the NR (NODE D) message. The node A receives the no request message sent by the node C or the node D, and starts the Wait Timer (WTR timer).

As shown in FIG. 6*b*, when the WTR timer is time out, the node A refreshes the address forwarding list, configures the PF flag in the e port at the same time, periodically sends the NR(RB)1 message (including the address refreshing information and the <Node JD(A), e> information) along the e port, and periodically sends the NR(RB)2 message (including the address refreshing information and the <Node_ID(A), e> information) along the w port at the same time, wherein the RB is the abbreviation of the RPL Blocked, indicating that: the ring protection link is blocked.

Without the generality, the node E on the ring is selected to perform the analysis, if its w port receives the NR(RB)1 message at first, the <Node JD(A), e> information in the NR(RB)1 message is read, and if this information is inconsistent with the previously stored <Node_ID, BPR>, the w port of the E node stores the <Node_ID(A), e> information, and deletes the previous <Node_ID, BPR> information. The E node detects that its w port is not configured with the PF flag, thus the E node refreshes the address forwarding list, and configures the PF flag in the e port; after a while, the node E receives the NR(RB)2 from its e port, reads the <Node JD(A), e> information from the NR(RB)2 message, and if this information is inconsistent with the <Node_ID, BPR> previously stored by the e port, the e port of the F node stores the <Node_ID(A), e> information, and deletes the previous <Node_ID, BPR> information. The E node detects that its e port is configured with the PF flag, and thus only deletes the PF flag configured on the e port.

It can be seen from the above analysis that the NR(RB)2 message will not cause the 2nd address refreshing action of the node E.

Figure 7:
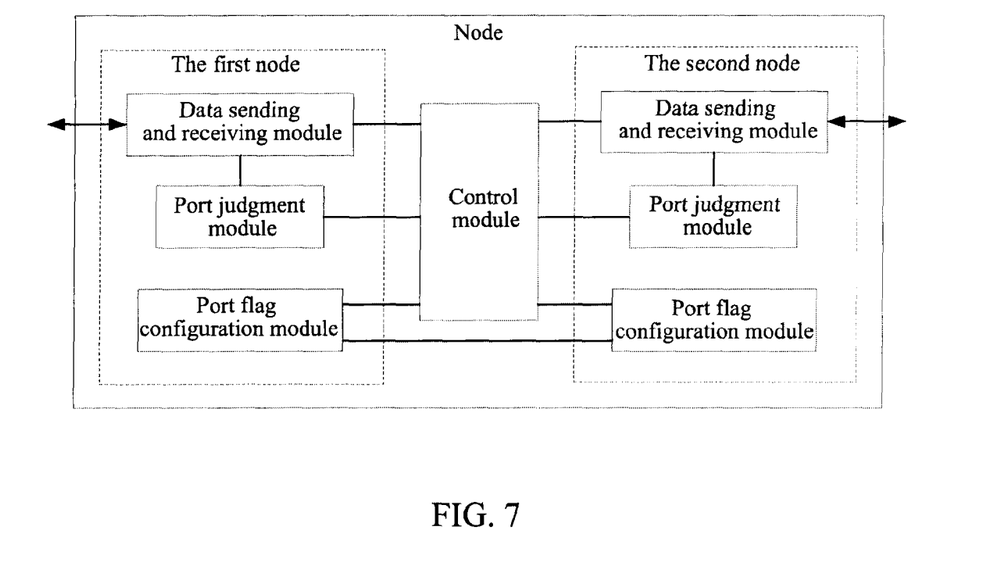
FIG. 7 is a schematic diagram of the system structure according to the example of the present invention.

The system for refreshing addresses of the Ethernet ring network, which implements the above method, comprises at least two nodes, each node has two ports on the ring, and as shown in FIG. 7, each node includes a control module; each port includes a port judgment module, a port flag configuration module, and a data sending and receiving module, wherein the port judgment module is for notifying the control module when judging that a fault occurs in a link related to a port or a faulty link related to a port recovers to a normal state;

the control module is for refreshing the address forwarding list after receiving a notification of the port judgment module or the notification of the port flag configuration module; is also for notifying the port flag configuration modules of the ports which are irrelative with the faulty link to configure the flag (PF) for indicating to suspend an operation of refreshing the address forwarding list; and is also for sending the protocol message with address refreshing information to other nodes on the ring by the data sending and receiving modules of the ports which are irrelative with the faulty link, and said protocol message at least includes the identifier information of this node and the identifier information of the ports related to the faulty link;

the port flag configuration module is for notifying said control module to refresh the address forwarding list when the identifier information included in the protocol message is inconsistent with the identifier information stored in this port and this port is not configured with said PF flag; and is for configuring said PF flag according to the control of said control module;

the data sending and receiving module is for sending and receiving various protocol message.

Furthermore, the port flag configuration module is further for: storing new identifier information if it is judged that the identifier information extracted from said protocol message is inconsistent with the identifier information stored in this port, and judging whether this port is configured with said PF flag, and if not configured, notifying said control module to refresh the address forwarding list, and notifying the port flag configuration module of another port on the ring to configure the PF flag, if configured, only deleting said PF flag. When the port flag configuration module judges that the identifier information extracted from said protocol message is consistent with the identifier information previously stored in this port and this port has been configured with said PF flag, the port flag configuration module only deletes said PF flag.

It should be described that the nodes in the above examples all include two ports on the ring. In the practical application, the node might include more than two ports. In specific operation, except the ports receiving the identifier information, the operation principle of other ports is similar to that of the previously mentioned corresponding ports, and will not be repeated any more herein.

Besides, the currently applied Ethernet has other various connection formats besides the previously mentioned Ethernet single ring network, and the communication network applying the address forwarding list is not only limited to the Ethernet. Since the method and system of the present invention can judge whether to refresh the address forwarding list based on the PF flag and further determine whether to refresh the address forwarding list according to the judgment result; and this operation does not change the network architecture and protocol dramatically, therefore, the method and system of the present invention can be applied in various communication networks in which the address forwarding list is applied, thereby efficiently reducing the phenomena of repeatedly refreshing the address forwarding list caused by the topology changing and greatly improving the network performance.

What is claimed is:

1. A method for refreshing addresses, comprising:

when a state switching between a link fault and a fault recovery occurs in a link, a node where a port related to said link is situated refreshing an address forwarding list and then configuring a flag for indicating to suspend an operation of refreshing an address forwarding list on other ports of said node, and sending protocol message with address refreshing information to other nodes; and a node to which a port receiving said address refreshing information belongs judging a consistency of the identifier information extracted from said protocol message with the identifier information previously stored in said port, and if inconsistent, this port storing the identifier information extracted from said protocol message, and judging whether this port is configured with said flag, and if not configured with the flag, the node where this port is situated refreshing the address forwarding list, and then configuring said flag on other ports, if configured with the flag, then said port deleting said flag without refreshing the address forwarding list.

2. The method of claim 1, wherein said node to which said port receiving said address refreshing information belongs further performs following operations:

judging a consistency of the identifier information extracted from said protocol message with the identifier information previously stored in said port, and if consistent and this port has been configured with the flag, only deleting this flag without refreshing the address forwarding list.

3. The method of claim 1, wherein the node where the port related to the link in which the state switching occurs further refreshes the address forwarding list.

4. The method of claim 1, wherein said protocol message at least includes identifier information of the node and identifier information of the port on the node related to a faulty link.

5. The method of claim 1, wherein said method is performed in an Ethernet single ring network.

6. A system for refreshing addresses, comprising at least two nodes, each node having at least two ports, wherein said node comprises at least one processor for executing a control module, a port judgment module and a port flag configuration module, wherein said port judgment module is for notifying said control module when a state switching between a link fault and a fault recovery occurs in a link;

said control module is for refreshing an address forwarding list according to a notification from said port flag configuration module; and notifying the port flag configuration module of a port which is irrelative to a faulty link to configure a flag for indicating to suspend an operation of refreshing an address forwarding list; and is also for sending protocol message with address refreshing information to other nodes after receiving a notification from said port judgment module;

said port flag configuration module is for judging a consistency of the identifier information extracted from said protocol message with the identifier information previously stored in said port, and if inconsistent, storing the identifier information extracted from said protocol message, and judging whether this port is configured with said flag, and if not configured with the flag, notifying the control module to refresh the address forwarding list, and configuring said flag on other ports, if configured with the flag, only deleting said flag without notifying the control module to refresh the address forwarding list.

7. The system of claim 6, wherein said port flag configuration module is further for refreshing the address forwarding list after receiving the notification from said port judgment module.

8. The system of claim 6, wherein said port flag configuration module is further for: deleting said PF flag only when judging that the identifier information included in the received protocol message is consistent with the identifier information stored in the port to which said port flag configuration module belongs and the port to which said port flag configuration module belongs has been configured with the flag.

9. The system of claim 6, wherein said system further comprises a data sending and receiving module, which is for supporting communication among all nodes in said system.

10. The system of claim 6, wherein said system is configured in an Ethernet single ring network.

11. The system of claim 6, wherein said protocol message at least includes the identifier information of the node and the identifier information of the port on the node related to the faulty link.

12. The method of claim 1, wherein the node where the port related to the link in which the state switching occurs further refreshes the address forwarding list.

13. The method of claim 2, wherein the node where the port related to the link in which the state switching occurs further refreshes the address forwarding list.

14. The method of claim 1, wherein said protocol message at least includes identifier information of the node and identifier information of the port on the node related to a faulty link.

15. The method of claim 2, wherein said protocol message at least includes identifier information of the node and identifier information of the port on the node related to a faulty link.

16. The system of claim 7, wherein said port flag configuration module is further for: deleting said flag only when judging that the identifier information included in the received protocol message is consistent with the identifier information stored in the port to which said port flag configuration module belongs and the port to which said port flag configuration module belongs has been configured with the flag.

* * * * *